(12) United States Patent
Allasia et al.

(10) Patent No.: US 7,746,767 B2
(45) Date of Patent: Jun. 29, 2010

(54) METHOD FOR PROVIDING EXTRA-TRAFFIC PATHS WITH CONNECTION PROTECTION IN A COMMUNICATION NETWORK, RELATED NETWORK AND COMPUTER PROGRAM PRODUCT THEREFOR

(75) Inventors: Andrea Allasia, Turin (IT); Roberto Rita, Rome (IT); Laura Serra, Turin (IT); Luigi Giuseppe Varetto, Turin (IT)

(73) Assignee: Telecom Italia S.p.A., Milan (IT)

( * ) Notice: Subject to any disclaimer, the term of this patent is extended or adjusted under 35 U.S.C. 154(b) by 1117 days.

(21) Appl. No.: 10/565,941

(22) PCT Filed: Aug. 5, 2003

(86) PCT No.: PCT/EP03/08633

§ 371 (c)(1),
(2), (4) Date: Jan. 26, 2006

(87) PCT Pub. No.: WO2005/015795

PCT Pub. Date: Feb. 17, 2005

(65) Prior Publication Data

US 2006/0221811 A1 Oct. 5, 2006

(51) Int. Cl.
*H04L 12/26* (2006.01)
(52) U.S. Cl. .............. 370/216; 370/222; 370/223; 370/224; 370/225; 370/227; 370/228; 370/248; 709/200; 709/220; 709/227; 709/239; 709/251; 714/820
(58) Field of Classification Search ......... 370/216–228, 370/248; 398/1, 59, 5, 3, 4; 714/820; 709/200, 709/220, 227, 239, 251
See application file for complete search history.

(56) References Cited

U.S. PATENT DOCUMENTS 5,448,572 A * 9/1995 Knox et al. ............. 370/228

(Continued)

FOREIGN PATENT DOCUMENTS

EP 1 014 611 A2 6/2000

(Continued)

OTHER PUBLICATIONS

Miyazaki, et al., "A Demonstration of an Optical Switch Circuit with "Bridge and Switch" Function in WDM Four-Fiber Ring Networks", IEICE Transactions on Communications, Institute of Electronics Information and Comm. Eng. Tokyo, JP, vol. E82-B, No. 2, pp. 326-333, XP000940183, (Feb. 2, 1999).

(Continued)

*Primary Examiner*—William Trost, IV
*Assistant Examiner*—Toan D Nguyen
(74) *Attorney, Agent, or Firm*—Finnegan, Henderson, Farabow, Garrett & Dunner, L.L.P.

(57) ABSTRACT

Extra traffic paths are provided in a communication network including at least two protection channels associated to respective transmission channels. Each protection channel admits an active state for carrying, in the presence of a failure in the associated transmission channel, traffic to be carried by the associated transmission channel, and a stand-by state, wherein the protection channel is adapted to carry extra traffic. The protection channels are run in a sub-network connection protection scheme, whereby one of the protection channels in its stand-by state is adapted to ensure recovery of extra traffic carried by the other protection channel while the other protection channel is switched to its active state or is subject to failure.

13 Claims, 5 Drawing Sheets

U.S. PATENT DOCUMENTS

| | | | | |
|---|---|---|---|---|
| 6,038,044 | A * | 3/2000 | Fee et al. | 398/56 |
| 6,626,590 | B1 * | 9/2003 | Nagatsu et al. | 398/59 |
| 6,714,518 | B1 * | 3/2004 | Weis | 370/248 |
| 6,795,394 | B1 * | 9/2004 | Swinkels et al. | 370/222 |
| 6,891,793 | B1 * | 5/2005 | Suzuki et al. | 370/217 |
| 7,016,300 | B2 * | 3/2006 | Luft et al. | 370/221 |
| 7,127,669 | B2 * | 10/2006 | Platenberg et al. | 714/820 |
| 7,130,263 | B1 * | 10/2006 | Ong et al. | 370/223 |
| 7,167,444 | B1 * | 1/2007 | Afferton | 370/222 |
| 7,242,664 | B2 * | 7/2007 | Einstein et al. | 370/216 |
| 7,269,346 | B1 * | 9/2007 | Iyer et al. | 398/3 |
| 7,277,631 | B1 * | 10/2007 | Iyer et al. | 398/1 |
| 7,307,946 | B2 * | 12/2007 | Okuno | 370/222 |
| 7,307,947 | B2 * | 12/2007 | Okuno | 370/222 |
| 2001/0038473 | A1 * | 11/2001 | Li et al. | 359/110 |
| 2002/0150042 | A1 | 10/2002 | Mathieu et al. | |
| 2002/0181392 | A1 * | 12/2002 | Okuno | 370/216 |
| 2002/0181479 | A1 * | 12/2002 | Okuno | 370/404 |
| 2003/0235412 | A1 * | 12/2003 | Dotaro et al. | 398/33 |
| 2004/0057375 | A1 * | 3/2004 | Shiragaki et al. | 370/216 |
| 2004/0076114 | A1 * | 4/2004 | Miriello et al. | 370/222 |
| 2004/0109408 | A1 * | 6/2004 | Mesh et al. | 370/222 |
| 2004/0213149 | A1 * | 10/2004 | Mascolo | 370/229 |
| 2004/0233842 | A1 * | 11/2004 | Lanzone et al. | 370/216 |
| 2005/0244158 | A1 * | 11/2005 | Luft | 398/59 |
| 2006/0221811 | A1 * | 10/2006 | Allasia et al. | 370/216 |

FOREIGN PATENT DOCUMENTS

| | | |
|---|---|---|
| EP | 1 280 374 A1 | 1/2003 |
| WO | WO 01/30006 A1 | 4/2001 |
| WO | WO 02/073903 A1 | 9/2002 |

OTHER PUBLICATIONS

ITU-T G.841, "Series G: Transmission Systems and Media, Digital Systems and Network—Types and Characteristics of SDH Network Protection Architectures", pp. i-v, 1-132, Oct. 1998.

ETSI, "Transmission and Multiplexing™; Generic Requirements of Transport Functionality of Equipment; Part 1-1: Generic Processes and Performance", ETSI EN 300 417-1-1,V1.2.1, pp. 1-151, XP002273772, (Oct. 12, 2001).

* cited by examiner

Fig_1 Prior Art

Fig_2 Prior Art

Fig_3

Fig_11

Fig_12

Fig_13

US 7,746,767 B2

METHOD FOR PROVIDING EXTRA-TRAFFIC PATHS WITH CONNECTION PROTECTION IN A COMMUNICATION NETWORK, RELATED NETWORK AND COMPUTER PROGRAM PRODUCT THEREFOR

CROSS REFERENCE TO RELATED APPLICATION

This application is a national phase application based on PCT/EP2003/008633, filed Aug. 5, 2003, the content of which is incorporated herein by reference.

FIELD OF THE INVENTION

The invention relates to telecommunication networks and was developed by paying specific attention to the possible application to ring architectures in SDH (Synchronous Digital Hierarchy) networks of the type currently designated MS-SPRing.

Reference to this possible field of application is not however to be construed as limiting the scope of the invention.

DESCRIPTION OF THE RELATED ART

Long distance transmission networks provide a wide variety of different telecommunication services, such as voice and Internet data or leased lines at different speeds.

These networks generally include a plurality of nodes, each typically located in a city or other high traffic location, coupled together in a closed loop or a ring/mesh architecture e.g. by fiber optic cables. The information travels over the fiber according to optical transmission standards such as e.g. those currently referred to as Synchronous Digital Hierarchy (SDH) or Synchronous Optical Network (SONET).

In ring architectures, traffic protection can be easily performed creating two separate links over the loop and dedicating the former to normal flow and the latter to protection, in order to ensure service when a fault event occurs in the former link.

This protection arrangement is currently designated sub-network connection protection (SNCP). In this kind of protection arrangement no specific mechanisms exist for coordinating both ends of the link. This means that no specific protocol exists for exchanging information between protection terminations about "switch" and "bridge" (e.g. protection) states.

One possible implementation of a sub network connection protection scheme involves two equipments that carry traffic along a certain infrastructure (e.g. a ring). The network element at the source end of the protection span transmits the protected channel over the two sides of the ring as a protection group. The network element at the sink end of the protection span outputs the received protection group as a choice of the "best" sides depending by switching criteria. In case no defects are detected in the working SNC/trail signals, these signals are selected as the normal signals. The SNCs/trails selected by the sink end are called the active SNCs/trails, while the others are called the standby SNCs/trails.

Trail protection schemes exist (such as the scheme designated Multiplex Section Protection or MSP) that offer the possibility of using an in band protocol in order to synchronize both terminations. This feature may be exploited to establish channels adapted to be routed via the protection trail/section/path in stand-by condition. The signals conveyed over such channels are usually called extra traffic (ET), see e.g. ETSI EN 300 417-1-1, v1.2.1, (2001/10), "Transmission multiplexing; generic requirements of transport functionality of equipment; Part1-1: generic process and performance; page. 18.

A so-called MS-SPRing protection scheme can be implemented by means of a two or four fiber Multiplex Section Shared Protection Ring (MS-SPRing). On each span, half of the capacity (with one or two couples of fibers) is dedicated to "working" channels and the other half to "protection" channels. Traffic can flow over the ring in a clockwise or counter-clockwise direction. In case of a single fiber failure, a span protection scheme is applied, and traffic is re-routed along the protection span adjacent to the failed one. In case of second order faults (e.g. working and protection fiber failures or node failure) a ring protection scheme is implemented and traffic is re-routed along the non-failed side of the ring.

Figure 1:
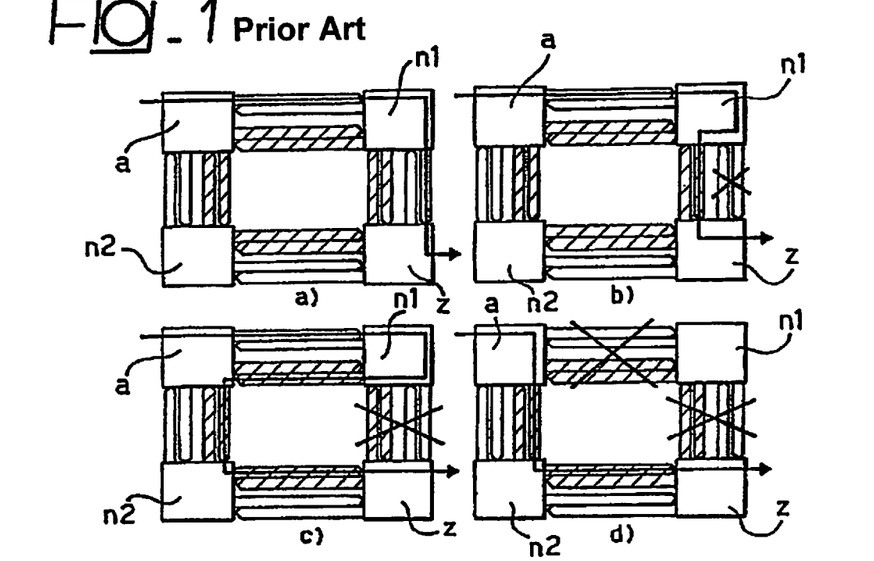

FIG. 1, including four portions designated a) to d) respectively, schematically represents the operation of a typical MS-SPRing protection scheme involving four nodes designated a, n1, n2, and Z.

In FIG. 1, "working" and "protection" fibers are shown, the protection fibers being represented by hashed areas and failure events by crosses.

Specifically, in FIG. 1 the four following conditions are shown:

(a) normal operation;
(b) span protection active;
(c) ring protection against double span failure and;
(d) ring protection against node isolation In addition to the normal MS-SPRing protection algorithm (which offers protected channels with high priority levels), the possibility exists of exploiting non-preemptible unprotected traffic (NUT) channels to offer an intermediate priority level and extra traffic (ET) channels having low priority levels.

In particular, some working and protection channels in a MS-SPRing arrangement can be used to carry NUT, which is unprotected traffic traveling on specific channels on working and protection paths of the ring. In case of failure, these channels cannot be cut off to support protection of normal traffic.

In bi-directional protection schemes, where a termination coordination protocol is available, the band normally reserved to protection can be exploited to carry extra traffic when the protection channel is in standby mode. Obviously, when a failure event occurs on the working path, and the protection scheme switches from the working to the protection path, the extra traffic channel is pre-empted and its recovery is not guaranteed.

Figure 2:
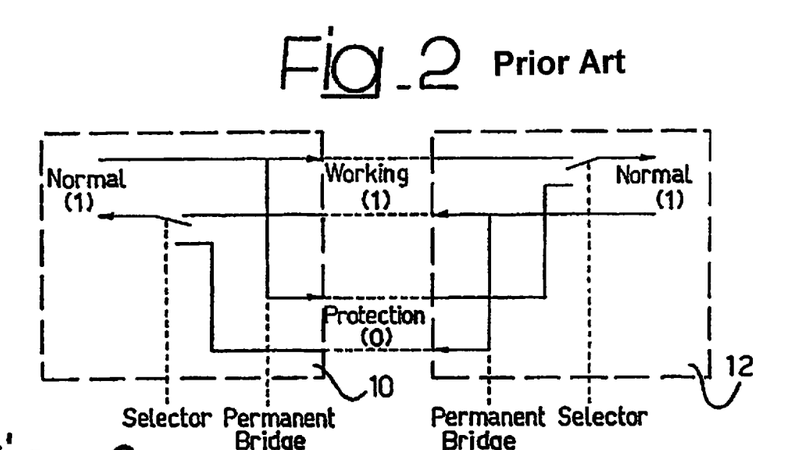

As shown in FIG. 2, a 1+1 protection architecture has one normal traffic signal, one working SNC/trail, one protection SNC/trail and a permanent bridge.

A m:n protection architecture has n normal traffic signals, n working SNCs/trails and m protection SNCs/trails. The signals on the working SNCs/trails are the normal traffic signals. The signal on a protection SNC/trail is either one of the normal traffic signals, an extra traffic signal, or a null signal. At the source end, any of the signals mentioned can be connected to the protection SNCs/trails. At the sink end, the signals from the working SNCs/trails are selected as the normal traffic signals. In case of a defect condition on a working SNC/trail, the transported signal is routed over one of the protection SNCs/trails. At the sink end, the signal from this protection SNC/trail is then selected instead.

The recommendation ITU-T G.841 "Series G: Transmission systems and media, digital systems and network—Types and characteristics of SDH network protection architectures", October 1998, indicates that a further differentiation on priority levels may be achieved by considering a sub network connection protection mechanism partially embedded in a MS-SPRing using NUT. In other words, NUT may be protected along the MS-SPRing with the implementation of a SNCP path. This kind of protection preserves NUT from double failures over a span.

NUT channels are however affected by two main disadvantages, namely:

for using a NUT channel, it is necessary to create more paths than needed; for example, for a NUT channel on the working bandwidth, it is necessary to dedicate it the slot number one of all the working and protection spans forming the ring;

for creating a non-planned link in a NUT configuration, it is necessary to perform a ring re-commissioning.

In WO-A-02/073903 an arrangement is disclosed for achieving an availability differentiation through the definition of a different technology also known as resilient packet ring (RPR) technology. In this arrangement, different availability levels are obtained by defining three classes of service each one having a different priority level. The three classes of traffic are the following: protected traffic (i.e. high priority); unprotected traffic (i.e. medium priority); and emptable traffic (i.e. low priority).

The main disadvantage of this solution is that operators wishing to develop network facilities to deploy different levels of service will be inevitably forced to change equipment with a great impact on the capital expenses.

Document WO-A-01/030006 describes a variant of the SNCP protection scheme discussed in the foregoing providing another implementation of a 1+1 protection scheme. Specifically, the possibility of carrying un-protected and un-rerouted extra traffic signals on the protection path of a 1+1 sub network connection protection scheme is suggested, when the protection trail is in a stand-by condition.

OBJECT AND SUMMARY OF THE INVENTION

The need therefore exists for improved arrangements that may be adapted to create paths with different availability levels by dispensing with the disadvantages intrinsic in the prior art arrangement discussed in the foregoing.

The object of the present invention is thus to provide such an improved arrangement.

According to the invention, such an object is achieved by means of method having the features set forth in the claims that follow. The invention relates to corresponding system, as well as a corresponding computer program product loadable in the memory of at least one computer and comprising software code portions for performing the steps of the method of invention when the product is run on at least one computer. Reference to "at least one" computer is intended to highlight the possibility for the arrangement of the invention to be carried out in a de-centralized manner.

A preferred embodiment of the invention is based on an improved way to protect extra traffic (ET) channels, by exploiting a sub network connection protection scheme applied to the MS-SPRing architecture.

Protection is based on the principles underlying the functional model of ITU-T Recommendation G.803.

As used herein, the intended meaning of "sub network connection protection" is not limited to the specific arrangement currently identified by the acronym SNCP, but also extends to equivalent protection schemes such as e.g. those known as MS-SPRing, Restoration and Multi Protocol Label Switching (MPLS) or Generalized MPLS.

Such a protection scheme preferably makes use of pre-assigned capacity between nodes. The simplest architecture has 1 working and 1 protection capacity (1+1), the most complex architecture has n working capacities and m protection capacities (m:n), respectively.

The arrangement described herein offers the possibility of creating a path protected service using two low priority extra traffic (ET) channels present in a four-fiber MS-SPRing arrangement. Extra traffic channels may be protected in a MS-SPRing structure by doubling an extra traffic channel along the clockwise and counter-clockwise sides of the ring and applying a sub network connection protection protocol.

This strategy of protection offers an opportunity for further differentiating the service priority levels. In fact, sub network connection protection on extra traffic channels allows recovery of such a low priority traffic in case of a single failure along any span of the ring. As a consequence, a new intermediate level of protection is achieved among the levels assured by NUT and SNCP protected NUT.

As indicated, NUT channels have two main disadvantages, namely:

for using a NUT channel, it is necessary to reserve more bandwidth than needed; for example, for a NUT channel on the working bandwidth, the slot "number one" slot of all the working and protection spans forming the ring must be dedicated to it; and in order to create a non-planned link in NUT configuration, it is necessary to perform a ring re-commissioning.

Referring to the disadvantages of NUT channels described in the previous section, extra traffic does not permanently reserve a channel along the protection path.

The arrangement described herein is technology independent. This means that only two basic requirements for the network protocol of transmission exist, namely:

having a form of circuit protection; and having the possibility of configuring low priority traffic with respect to the normally protected one.

The matching between low priority path and sub network connection protection capabilities can be achieved either on the same network equipment or on a different equipment. In other words, almost all the network equipments having low priority traffic capabilities are adapted to use the combination with SNCP protection.

By way of direct comparison, while the arrangement shown in WO-A-01/030006 discloses the possibility of carrying extra traffic over a 1+1 SNCP protection scheme (which i.a. is not described in normative documents), in the arrangement described herein the protection path of a MS-SPRing scheme is exploited to carry extra traffic signals and a method to protect ET by a 1+1 SNCP implementation scheme is shown.

A preferred embodiment of the arrangement disclosed herein thus provides extra traffic paths in a communication network including at least two protection channels associated to respective transmission channels.

Each protection channel admits:

an active state for carrying, in the presence of a failure in said associated transmission channel, traffic to be carried by the associated transmission channel, and a stand-by state, wherein the protection channel is adapted to carry extra traffic.

The protection channels are run in a sub-network connection protection scheme, whereby one of the protection channels in its stand-by state is adapted to ensure recovery of extra traffic carried by the other protection channel while the other protection channel is switched to its active state or is subject to failure.

Preferred embodiments of the arrangement disclosed herein provide:

at least one ring structure including non-coextensive paths and associating the at least two protection channels to respective non-coextensive paths in the ring (i.e. by resorting to what is currently designated "routing diversity", and a plurality of ring structures and associating the at least two protection channels to respective, different rings of the plurality of rings.

BRIEF DESCRIPTION OF THE DRAWINGS

The invention will now be described, by way of example only, by referring to the enclosed figures of drawing, wherein:

FIGS. 1 and 2, related to the prior art, has been described previously,

DETAILED DESCRIPTION OF PREFERRED EMBODIMENT OF THE INVENTION

Figure 3:
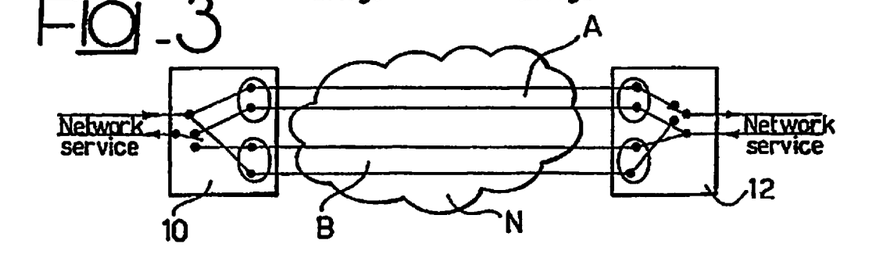
FIG. 3 shows an SNCP protected path through two extra traffic channels between two different nodes.

FIG. 3 of the drawing is a representation of a SNCP protected path between two equipments 10 and 12.

A backbone network based on a ring interconnected architecture with four fibers MS-SPRing protection can offer a wide network service portfolio based on different levels of availability. The arrangement described herein enlarges the possibilities of service level differentiation on a MS-SPRing SDH network.

This arrangement is essentially the application of the SNCP protection scheme to extra traffic channels A, B in a network N extending between two equipments 10 and 12. The two extra traffic channels A and B are sent along the working and protection trails of a SNCP protection architecture. Specifically, FIG. 4 shows a SNCP protected path including two extra traffic channels between two different nodes 10 and 12.

Figure 4:
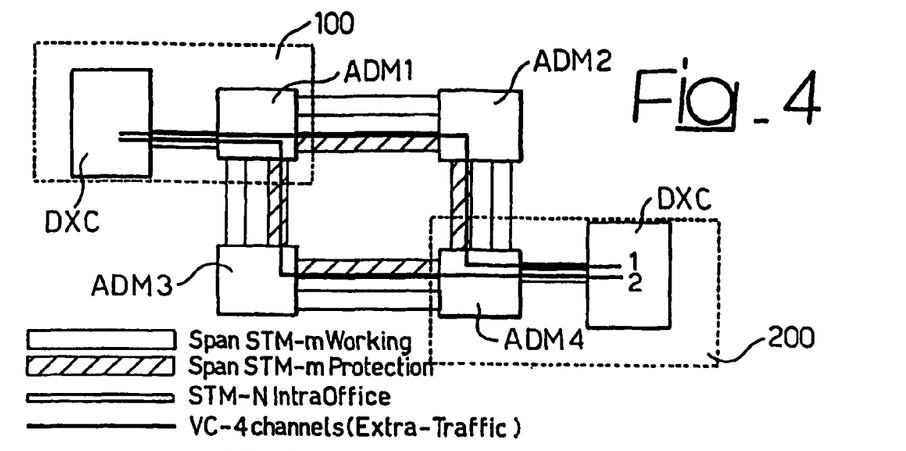
FIG. 4 shows a ring arrangement implementing a four fiber MS-SPRing protection scheme.

FIG. 4 shows a four fiber MS-SPRing protection scheme architecture, with extra traffic on the bandwidth of the protection sections. Specifically, FIG. 4 (and FIGS. 5 to 8 as well) refer to a ring arrangement provided between two nodes 100, 200 including respective data exchange control (DXC) modules and including four add-drop multiplexers ADM1 to ADM4. Two extra traffic channels are depicted, routed on the two opposite sides of the ring.

In the ring with four fiber MS-SPRing protection scheme, the bandwidth of the protection paths may be dedicated to extra traffic as shown with two extra traffic channels, on the two opposite sides of the ring. The paths terminate on two digital cross connects.

Figure 5:
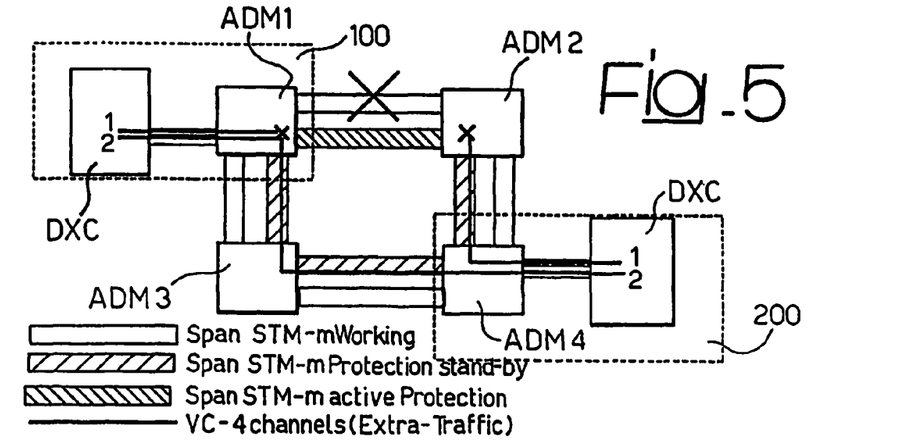
FIGS. 5 and 6 show two possible failure events occurring in the arrangement of FIG. 4.

FIG. 5 shows interruption of channel number 1 when a span failure occurs, with channel number 2 working normally and the state of the two extra traffic channels in case of span protection: path number 1 is out because the protection path is devoted to normal traffic span protection, while path number 2 is regularly in service.

Figure 6:
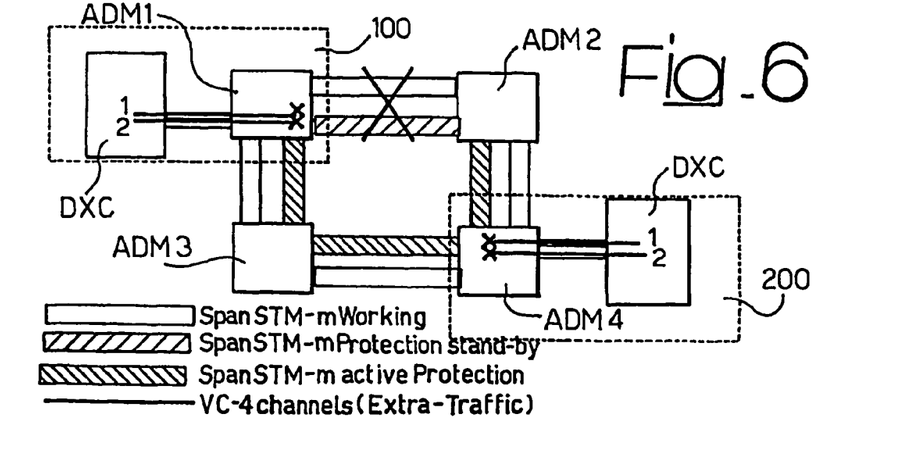

FIG. 6 shows interruption of channels number 1 and number 2 when a double span failure occurs. The ring works in ring protection mode in which both extra traffic paths have been empted to allow the re-routing of high priority traffic.

Service level agreement currently require that, when this faulty condition occurs, ring fibers and/or equipments must be repaired in a few hours (typically less then one work day).

As already mentioned in the foregoing, referring to NUT channels, a further differentiation on priority levels may be achieved by a composite solution, using NUT channels in a four fiber MS-SPRing with an overlaid sub network connection protection scheme. In other words, NUT may be protected along the MS-SPRing with the implementation of a sub network connection protection path. This kind of protection preserves NUT from double failures along a span.

The different solutions analyzed so far are not exempt from certain critical aspects.

NUT channels allow both protected and unprotected channels on the same infrastructure but, when a ring is in the commissioning phase, necessitate exactly planning the bandwidth requirements because any difference implies a new re-commissioning phase in order to optimize the reused ring bandwidth.

Sub network connection protection of NUT channels implies that, in the network planning phase, i.e. in the ring commissioning phase, the NUT channels required to carry out traffic demands must be defined. For just one traffic demand it is necessary to define one slot for the whole ring as NUT (this implies that the bandwidth allocated is greater than the one effectively used)

Using extra traffic channels on a MS-SPRing infrastructure offers an availability level that is much lower in comparison with the protected channels. In addition, the extra traffic availability is also affected by long outage periods due to planned maintenance activity.

A preferred embodiment of the arrangement described herein offers the possibility of creating a path protected service using two low priority extra traffic channels present on four-fiber MS-SPRing.

As previously discussed in the case of NUT, extra traffic channels may be protected in a MS-SPRing structure by doubling an extra traffic channel along the clockwise and counter-clockwise sides of the ring and applying a sub network connection protection protocol.

This protection scheme offers an opportunity to further differentiate the service priority levels. In fact, sub network connection protection of extra traffic channels allows the recovery of low priority traffic in case of a single failure along any span of the ring.

Availability evaluation shows that the protection level obtained is higher than in the case of simple NUT channels (this is because the path is protected on the two different routes of the ring) but lower with respect to SNCP protected NUT.

In comparison with the NUT implementation, an advantage of using extra traffic channels with an sub network connection protection scheme lies in planning the ring capacity for extra traffic services, so a commissioning activity is not required any time an extra traffic channel is to be provisioned.

Within this context, at least two embodiments are possible, namely:

two extra traffic channels protected with a sub network connection protection scheme having the bridge/selector function performed on the same add drop multiplexers (ADMs) forming the ring; and two extra traffic channels protected with an SNCP scheme having the bridge/selector function performed on digital cross connects (i.e. DXCs).

Figure 7:
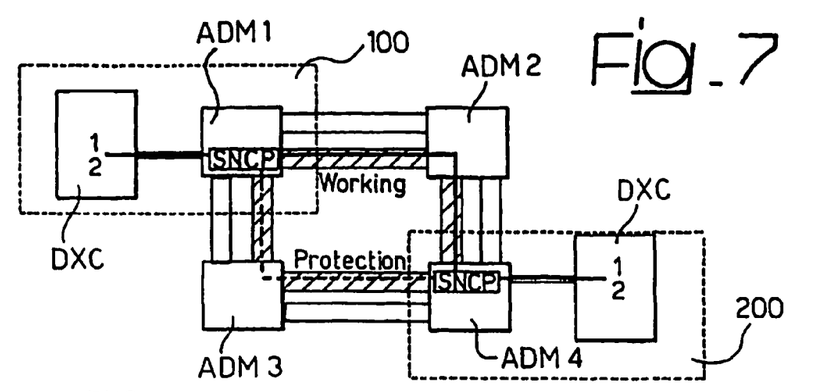
FIG. 7 shows two extra traffic channels protected with a sub network connection protection scheme.

Specifically, FIG. 7 shows two extra traffic channels protected with a sub network connection protection scheme having the bridge/selector performed on the same add drop multiplexers (ADMs) forming the ring.

Figure 8:
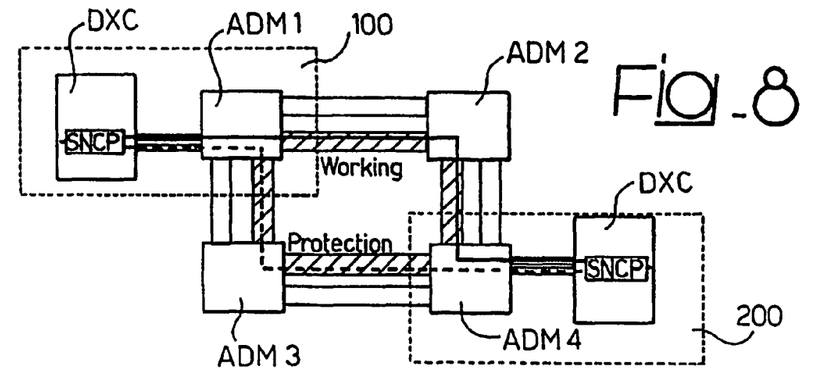
FIG. 8 shows an alternative arrangement to the arrangement of FIG. 7, FIGS. 9 and 10 show various arrangements for routing differentiation over two rings.

Conversely, FIG. 8 shows two extra traffic channels protected with a sub network connection protection scheme having the bridge/selector performed on digital cross connects (DXCs).

In the implementation of the sub network connection protection scheme over the add drop multiplexers (ADMs) forming the ring infrastructure that carries traffic patterns, a sub-network termination point is created that includes two extra traffic paths routing over the two opposite sides of the ring, as represented in FIG. 4.

In the implementation of the sub network connection extra traffic protection scheme over the DXCs, the equipment represents the path termination, in a specific network domain, of a path created by two extra traffic sub-paths protected via a sub network connection protection scheme. In this latter case, different possibilities exist for establishing the extra traffic services, that depend on the routing strategy applied to the infrastructure (e.g. routing via minimum number of rings.

Specifically the following situations may arise:

in case of extra traffic paths protected via the SNCP algorithm over a single ring, as described above, the SNCP mechanism can be configured over the ADMs while the ring infrastructure deploys the ET paths in routing diversity (see again FIG. 7);

in case of extra traffic paths protected via the sub network connection protection algorithm over the same ring, the sub network connection protection mechanism can be configured over the DXCs as a variant of the previous scheme (see, in that respect, FIG. 8);

in case of extra traffic paths protected via SNCP algorithm over different rings, the sub network connection protection mechanism can be configured over the DXC and the ring infrastructure should be represented as extra traffic paths carried over two different rings belonging to the same class (i.e. a ring number "one" an a ring number "two")

Extra traffic paths can also be carried over two rings belonging to different ring classes (i.e. a ring number "one" of class A and a ring number "one" of class B).

In respect of this last mentioned option, it is important to understand that this strategy achieves an improvement in terms of path survivability and, specifically, offers good protection level when a planned maintenance activity affects the operability condition of one of the extra traffic paths used in SNCP protection scheme.

In order to reach the maximum theoretical advantage from extra traffic paths carried out over two different rings of the same class, the working and the protection paths are planned on different routing. If the different routing is represented by two rings that belong to the same class (over the same cable infrastructure are deployed two or more different ring systems, a. A way of obtaining routing diversification is to route one extra traffic path on one side of the first ring and the second extra traffic on the opposite side of the second ring. This means that only two faults over the same span (working and protection) may lead to an out of service condition.

Figure 9:
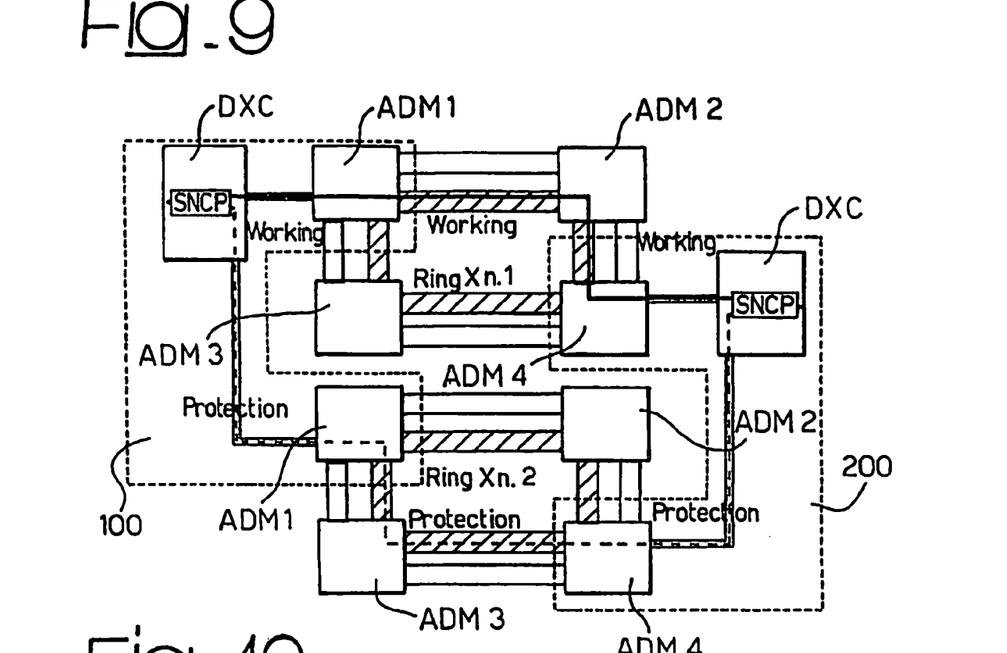

Specifically, FIG. 9 shows routing differentiation over two rings of the same class, which leads to a significant advantage from the extra traffic protection via a sub network connection protection scheme.

In the case of extra traffic paths carried out over two rings belonging to different ring classes, a complete diversification of routing (i.e. different equipments and infrastructures) is possible, so that the availability level reaches its maximum.

Figure 10:
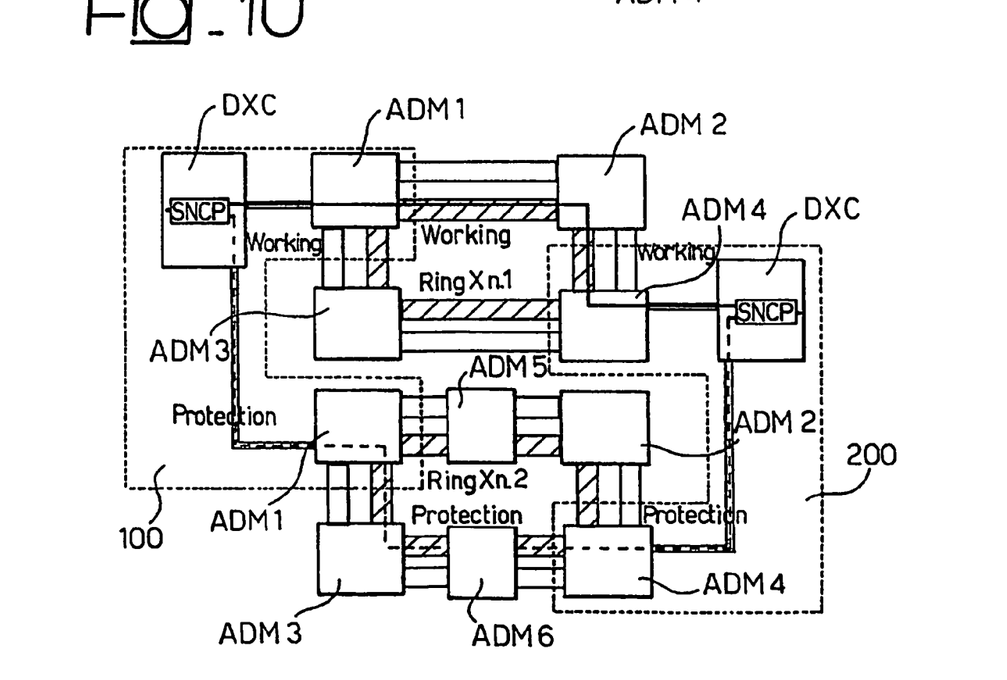

In that respect, FIG. 10 shows routing differentiation over two rings of the same class, which leads to a maximum advantage from the extra traffic protection via a sub network connection protection scheme.

It will be appreciated that two additional ADMs (namely ADM5 and ADM6) are shown in ring number one of class Y in order to highlight that the ring structures considered herein may include any number of network equipments as provided for in the ITU-T G.841 specification.

The following is a discussion of investigations performed on a ring structure interconnecting two geographical sites (again designated 100 and 200) with two different paths named red (R) and blue (B) directions.

The unavailability figures of NUT and extra traffic (ET) channels have been calculated in three cases.

Figure 11:
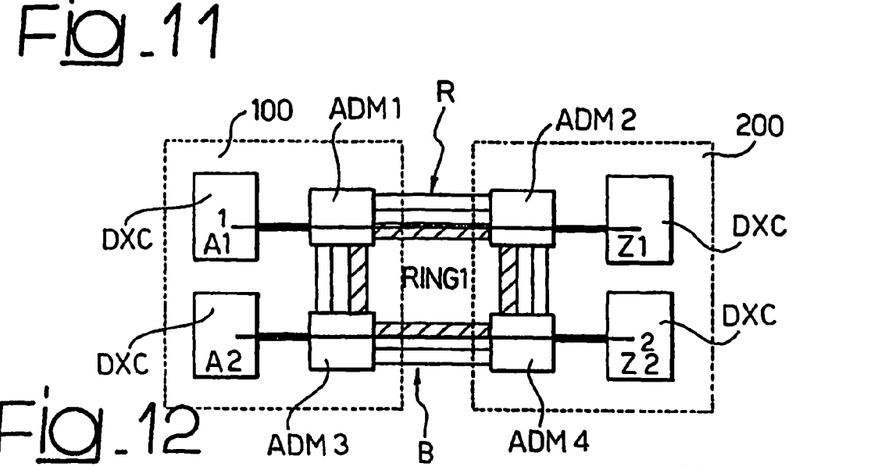
FIGS. 11, 12 and 13 show various configurations for availability/unavailability evaluation.

In the first case (FIG. 11), the calculation is performed on a point-to-point link, along the red (R) or blue (B) paths.

Figures 12, 13:
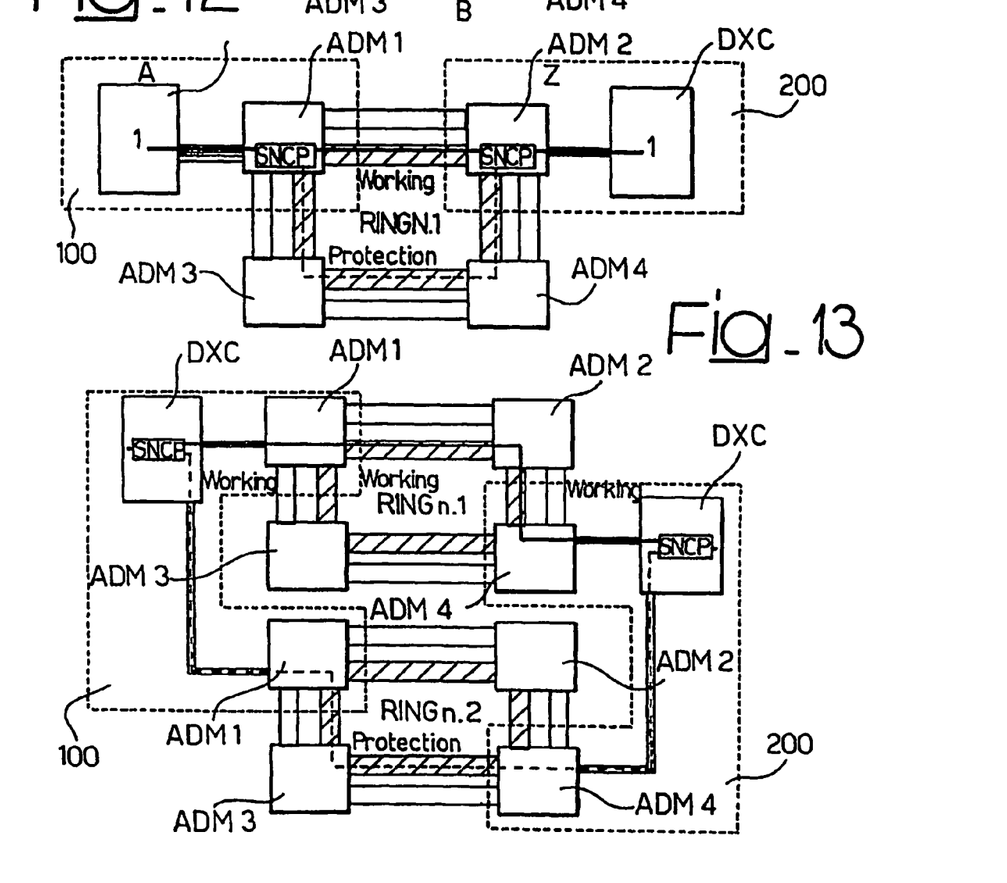

In the second case (FIG. 12), two NUT or ET channels have been created along the red (R) and blue (B) paths, in order to perform a sub network connection protection scheme (the shortest path has been considered as "working" and the longest one as "protection").

In the third case (FIG. 13) the sub network connection protection scheme is performed on the DXC equipment, thus allowing the infrastructure diversification of the working and protection channels (ring 1 and ring 2).

The equipments and infrastructure unavailability values are reported in Table 1 below

TABLE 1

| Network element | Functional lock | Unavailability [abs] |
| --- | --- | --- |
| ADM | STM1 ports | 1.36711E−05 |
|  | Matrix | 1.37079E−10 |
|  | Common parts | 3.52434E−05 |
|  | Line ports | 2.53672E−05 |
| RED | STM1 ports | 4.11369E−06 |
|  | Matrix | 1.0824E−09 |
|  | Common parts | 1.46034E−05 |
| Ring characteristics | Fibre/km | 0.000003 |
|  | Rings circumference | 1000 km |
|  | n. ADM/ring | 4 |

Table 2 summarizes the results obtained in the three cases described above.

TABLE 2

| Case | Node A | Node Z | Path | Protection type | Unavailability [abs] | Availability [%] | Unav. min/year |
|---|---|---|---|---|---|---|---|
| 1 | A1 | Z1 | red | ET | 0.008218322 | 99.180 | 4319 |
|  | A2 | Z2 | blue | ET | 0.00900645 | 99.100 | 4733 |
|  | A1 | Z1 | red | NUT | 0.00474275 | 99.526 | 2493 |
|  | A2 | Z2 | blue | NUT | 0.00545401 | 99.455 | 2867 |
| 2 | A | Z | ring 1 | ET SNCP ADM | 0.00011064 | 99.990 | 58 |
|  | A | Z | ring 1 | NUT SNCP ADM | 0.00002587 | 99.997 | 14 |
|  | A | Z | ring 1 | MS-SPRing protected ADM | 0.00002055 | 99.998 | 11 |
| 3 | A | Z | ring 1-2 | ET SNCP RED | 0.00013148 | 99.989 | 69 |
|  | A | Z | ring 1-2 | NUT SNCP RED | 0.00004420 | 99.996 | 23 |
|  | A | Z | ring 1 | MS-SPRing protected RED | 0.00004175 | 99.996 | 22 |
|  | A | Z | ring 2 | MS-SPRing protected RED | 0.00004162 | 99.996 | 22 |

The data show NUT channels to have fewer minutes of unavailability when compared to the ET channels. For both types of protection, the order of magnitude ranges from the thousands of minutes in the non-protected case to tens of minutes for the SNCP ones. The unavailability of ET channels protected SNCP stands in between the unavailability figures of unprotected and SNCP protected NUT.

The arrangement described herein is adapted for use in meshed architecture networks where ET sub-paths use the bandwidth defined for traffic restoration. This is shown, in quite general terms, in FIG. 14, where one such network is indicated by the reference number 1000.

Figure 14:
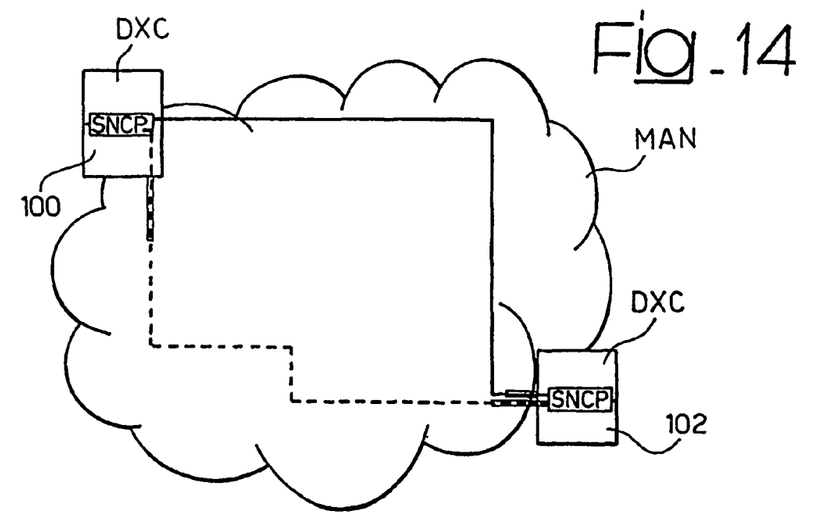
FIG. 14 is a general representation of extra traffic protected via a sub network connection protection scheme.

The meshed infrastructure shown therein is implemented via digital cross connects interconnected with line terminals. Each branch in the network plan has associated a certain amount of bandwidth to recover equipment or cable failures. When the network efficiency is failure exempt, the band reserved to recovery is unused and can be configured to carry out ET. In order to increase the availability ratio it is possible to protect two channels by an sub network connection protection scheme.

The focus of the arrangement described herein is on the protection of paths realized in low priority configuration. The embodiment described concerns SDH technology with ring or meshed architecture.

In this kind of network, data are transmitted via TDM (Time Division Multiplexing) in those protected channels (i.e. high priority channels) whose length is fixed (VC). Each channel carries one or more circuit data flows defined by the implemented protocol. Networks of this kind include, for example, SDH (Synchronous Digital Hierarchy) or SONET (Synchronous Optical Network) networks.

In this kind of network, with high priority channel, extra traffic channels (i.e. low priority channels) can be configured in various ways.

In WDM (Wavelength Division Multiplexing) networks, data are transmitted on different wavelengths, which replace the multiplexing time slots. With this technology it is possible to create the so called "lambda" protected paths; the lambda (i.e. the wavelength) reserved to the protection of the main lambda, or in sharing with a bundle of other lambdas, can be assigned the role of carrying low priority traffic. From a technical point of view, extra traffic in SDH and SONET networks and low priority lambdas in WDM networks can be considered equivalent. They are both emptable channels when a failure state occurs, regardless of the actual physical implementation of the network.

Also, SDM (Space Division Multiplexing) or FDM (Frequency Division Multiplexing) networks can be similarly implemented. In these cases the concept of Extra Traffic paths is associated to intervals of space or frequency. As is well known, FDM was the dominant technology before TDM technology was developed.

The invention refers to all types of networks based on the concept of circuit protection described above. Specifically, reference made in the description to TDM (SDH and SONET) and WDM networks is primarily dictated by their current popularity.

A restoration application makes use of any capacity available between nodes. In general, restoration will involve re-routing. When restoration is used, a percentage of the transport network capacity will be reserved for re-routing working traffic. Restoration is initiated (in a known manner) by the network operator and as such does not fall within the scope of the present document.

It is thus evident that, the basic principles of the invention remaining the same, the details and embodiments may widely vary with respect to what has been described and illustrated purely by way of example, without departing from the scope of the presented invention as defined in the annexed claims.

The invention claimed is:

1. A method of providing extra traffic paths in a communication network comprising at least two protection channels associated to respective transmission channels, each of said at least two protection channels admitting an active state for carrying, in the presence of a failure in at least one of the associated transmission channels, traffic to be carried by at least one of the associated transmission channels and a stand-by state, wherein at least one of the protection channels is adapted to carry extra traffic, comprising:

running said at least two protection channels in a sub-network connection protection scheme, whereby one of said at least two protection channels in said stand-by state is adapted to ensure recovery of extra traffic carried by another of said at least two protection channels while one of the following conditions is met:

said another of said at least two protection channels is switched to said active state, and said another of said at least two protection channels is subject to failure;

providing in said communication network a plurality of ring structures;

associating said at least two protection channels to two respective different rings of said plurality of rings; and providing non-preemptible unprotected traffic carried on non preemptible channels in said network as well as non-preemptible channels protected by a sub-network connection protection scheme, wherein said extra traffic is ensured an intermediate level of availability between the levels of protection provided by said non preemptible channels and by said non-preemptible channels protected by said sub-network connection protection scheme.

2. The method of claim 1, comprising the steps of:

associating to each of said at least two protection channels corresponding input and output digital cross connects; and running said sub-network connection protection scheme at said input and output digital cross connects.

3. The method of claim 1, comprising the steps of:

associating to each of said at least two protection channels corresponding input and output add-drop multiplexers; and running said sub-network connection protection scheme at said input and output add-drop multiplexers.

4. The method of claim 1, comprising the step of providing in said communication network at least one ring structure including non-coextensive paths and the step of associating said at least two protecting channels to respective non-coextensive paths in said at least one ring structure including non-coextensive paths.

5. The method of claim 1, comprising the step of selecting said two different rings as rings belonging to the same class of rings.

6. The method of claim 1, comprising the step of selecting said two different rings as rings belonging to different classes of rings.

7. A computer readable medium encoded with a computer program product capable of being loaded into a memory of at least one computer, the computer program product including software code portions for performing the steps of the method of any one of claims 1 to 4, 5, and 6.

8. A communication network comprising:

at least two protection channels associated to respective transmission channels, each of said at least two protection channels admitting an active state for carrying, in the presence of a failure in at least one of the associated transmission channels, traffic to be carried by at least one of the associated transmission channels and a stand-by state, wherein at least one of the protection channels is adapted to carry extra traffic, said at least two protection channels jointly defining a sub-network connection protection scheme, whereby one of said at least two protection channels in said stand-by state is adapted to ensure recovery of extra traffic carried by another of said at least two protection channels while one of the following conditions is met:

said another of said at least two protection channels is switched to said active state, and said another of said at least two protection channels is subject to failure;

a plurality of ring structures and wherein said at least two protection channels are associated to two respective different rings of said plurality of rings; and wherein at least one of the at least two protection channels is adapted to provide non-preemptible unprotected traffic carried on non preemptible channels in said network as well as non-preemptible channels protected by a sub-network connection protection scheme, and wherein said extra traffic is ensured an intermediate level of availability between the levels of protection provided by said non preemptible channels and by said non-preemptible channels protected by said sub-network connection protection scheme.

9. The network of claim 8, comprising corresponding input and output digital cross connects associated to each of said at least two protection channels and wherein said input and output digital cross connects jointly define said sub-network connection protection scheme.

10. The network of claim 8, comprising corresponding input and output add-drop multiplexers associated to each of said at least two protection channels and wherein said input and output add-drop multiplexers jointly define said sub-network connection protection scheme.

11. The network of claim 8, comprising at least one ring structure including non-coextensive paths and wherein said at least two protecting channels are associated to respective non-coextensive paths in said ring.

12. The network of claim 8, wherein said two different rings belong to the same class.

13. The network of claim 8, wherein said two different rings belong to different ring classes.

\* \* \* \* \*